US006322611B1

(12) United States Patent
Engler

(10) Patent No.: US 6,322,611 B1
(45) Date of Patent: Nov. 27, 2001

(54) PROCESS AND INSTALLATION FOR THE PRODUCTION OF CARBON MONOXIDE

(75) Inventor: Yves Engler, Vincennes (FR)

(73) Assignee: L'Air Liquide, Societe Anonyme pour L'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/476,992

(22) Filed: Jan. 4, 2000

(30) Foreign Application Priority Data

Jan. 5, 1999 (FR) .................................................. 99 00020

(51) Int. Cl.[7] .......................... B01D 53/047; B01D 53/22
(52) U.S. Cl. ..................... 95/55; 95/96; 95/117; 95/139; 95/143
(58) Field of Search ..................... 95/45, 55, 96, 95/103, 139, 117, 143; 96/4, 9, 130, 134, 136, 142, 143

(56) References Cited

U.S. PATENT DOCUMENTS

| 4,229,188 | * | 10/1980 | Intille | 95/55 |
| 4,238,204 | * | 12/1980 | Perry | 95/55 |
| 4,398,926 | * | 8/1983 | Doshi | 95/55 |
| 4,645,516 | * | 2/1987 | Doshi | 95/55 X |
| 4,654,063 | * | 3/1987 | Auvil et al. | 95/55 X |
| 4,732,596 | | 3/1988 | Nicholas et al. | 62/18 |
| 4,750,925 | * | 6/1988 | MacLean et al. | 95/55 X |
| 4,836,833 | | 6/1989 | Nicholas et al. | 55/16 |
| 5,073,356 | * | 12/1991 | Guro et al. | 423/415 A |
| 5,131,930 | * | 7/1992 | Vines | 95/55 |
| 5,827,351 | * | 10/1998 | Prasad et al. | 95/45 |

FOREIGN PATENT DOCUMENTS

| 0 476 656 | 3/1992 | (EP) . |
| 0 595 100 | 5/1994 | (EP) . |

* cited by examiner

Primary Examiner—Robert H. Spitzer
(74) Attorney, Agent, or Firm—Young & Thompson

(57) ABSTRACT

A synthesis gas obtained by steam reforming is sent to a pressure swing adsorption unit (2) which separates a $CO/H_2$ mixture, as a production gas, from the other constituents. The $CO/H_2$ mixture is sent to a unit (3) for at least partially purifying CO, for example a permeation unit, which produces under pressure the CO with high purity or an $H_2/CO$ mixture with an adjusted CO content, containing very little impurities.

9 Claims, 3 Drawing Sheets

PROCESS AND INSTALLATION FOR THE PRODUCTION OF CARBON MONOXIDE

BACKGROUND OF THE INVENTION

The present invention relates to a process and to an installation for the production of CO (carbon monoxide) from a supply gas containing essentially, in addition to CO, hydrogen $H_2$ and other constituents, particularly $CO_2$ (carbon dioxide), methane and water.

SUMMARY OF THE INVENTION

The invention has for its object to provide a technique permitting producing economically CO with high purity and at a directly usable pressure.

To this end, in the process according to the invention:

in a first step, the supply gas is sent to a pressure swing adsorption (PSA) unit which contains an adsorbent having a low affinity for hydrogen and the CO and a high affinity for said other constituents; and the production gas is sent from the PSA unit, consisting essentially of a mix of $CO/H_2$ mixture, to a unit for the at least partial purification of the CO, of the permeation type provided with membranes with a $CO/H_2$ selectivity, supplying at its outlet pure CO.

The installation according to the invention, adapted to practice the process defined above, comprises:

a pressure swing adsorption (PSA) unit which contains an adsorbent having a low affinity for the hydrogen and the CO and a high affinity for said other constituents, this unit being connected to a source of said supply gas; and a unit for at least partially purifying the CO, of the permeation type, whose inlet is connected to the outlet for the production of $CO/H_2$ mixture from the PSA unit, the permeation being provided with membranes having a high $CO/H_2$ selectivity.

BRIEF DESCRIPTION OF THE DRAWINGS

Examples of the practice of the invention will now be described with respect to the accompanying drawings, in which.

DESCRIPTION OF THE PREFERRED EMBODIMENTS

Figure 1:
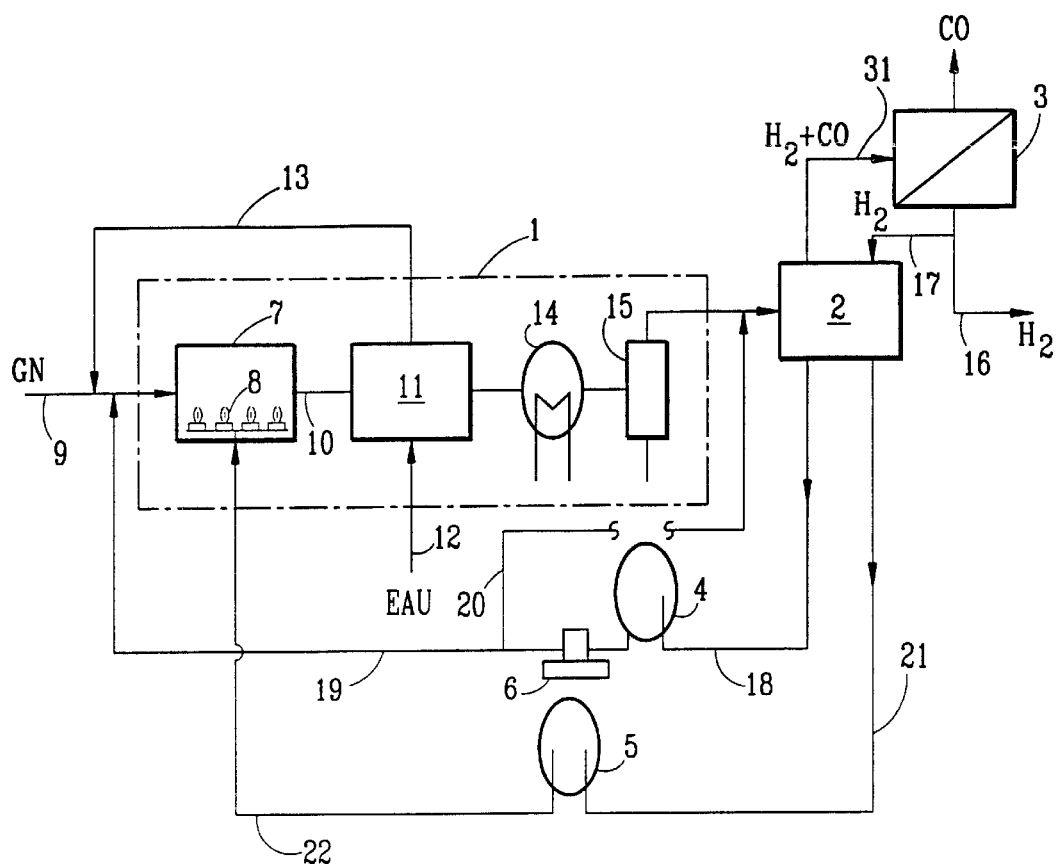
FIG. 1 is a diagram of an installation for the production of CO according to the invention.

The installation shown by way of example in FIG. 1 comprises essentially a unit 1 for steam reformation, a unit 2 for pressure swing adsorption (PSA), a permeation unit 3, two buffer tanks 4 and 5 and a compressor 6. The unit 3 is provided with membranes, for example of polyaramid, having a high $CO/H_2$ selectivity.

The unit 1 comprises a reforming chamber 7 provided with burners 8 and supplied with a light hydrocarbon charge, for example natural gas, via a supply conduit 9. Its output conduit 10, which gives on the inlet of the PSA unit 2, passes through a heat recuperator 11 supplied with demineralized water via a conduit 12. The water vaporized in 11 is introduced into the conduit 9 via a conduit 13.

The conduit 10 then passes through a cooling device 14, then the condensed water is eliminated in a phase separator 15. The gas from this latter constitutes a synthesis gas, or reforming gas, which contains principally hydrogen and Co and substantial quantities of methane and $Co_2$, as well as water. A typical composition can be 68% $H_2$, 22% CO, 6% $CO_2$ and 4% $CH_4$ (apart from water). The units 2 and 3 serve to purify the CO, in a manner which will now be described.

Generally speaking, the PSA unit 2 produces a $CO/H_2$ mixture that is fairly pure, from synthesis gas. This mixture is separated by the unit 3 on the one hand into a pure CO stream under pressure, on the other hand into an impure hydrogen stream containing several percent, typically 1 to 3% of CO, at low pressure, typically below about 1.3 bar absolute. The hydrogen can be sent via a conduit 16 to a user, and at least a portion is used to regenerate the adsorbent of the unit 2 via a conduit 17.

Moreover, the PSA unit 2 produces two residual fractions: a first fraction relatively rich in $Co_2$, which is sent to the buffer tank 4 via a conduit 18. From there, this fraction is compressed in the compressor 6 and recycled to the supply 9 of the reforming unit 1, via a conduit 19. If desired, a flow of this same compressed fraction, which contains a substantial quantity of CO, can be recycled to the PSA unit 2, via a conduit 20, for recovering the CO.

The second residual fraction from the unit 2, rich in hydrogen, is sent via a conduit 21 to the buffer tank 5, and from there, via a conduit 22, to supply the burners 8.

Figure 2:
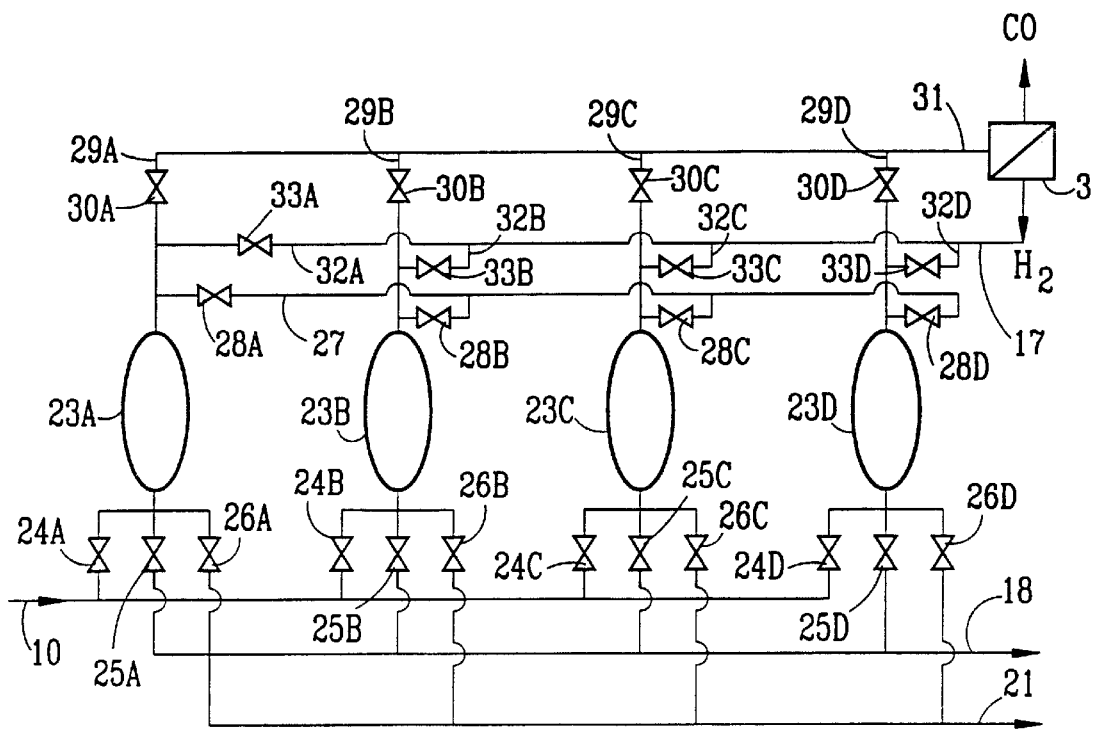
FIG. 2 is a diagram of the PSA unit of this installation.

There will now be briefly described the PSA unit 2 with reference to FIG. 2.

This unit 2 comprises essentially two to twelve adsorbers, and in this example four adsorbers 23A to 23D, disposed in parallel. The inlet, which is to say the lower end, of each adsorber can be connected selectively:

via a valve 24A to 24D, to the supply conduit 10;

via a valve 25A to 25D, to the recycle conduit 18; and via a valve 26A to 26D, to the recycle conduit 21.

The outlet, which is to say the upper end, of each adsorber can be connected selectively:

to the outlet of any one of the other adsorbers, via a balancing conduit 27 and valves 28A to 28D;

to the inlet of the permeation unit 3 via a conduit 29A to 29D provided with a valve 30A to 30D. The four conduits 29A to 29D join in a single conduit 31 for supplying the unit 3 with $CO/H_2$ mixture; and to the hydrogen recycle conduit 17 via conduits 32A to 32D provided with valves 33A to 33D.

Each adsorber contains a bed of an adsorbent having a very high affinity for the compounds $H_2O$, $CO_2$, $CH_4$ and a very low affinity for CO and hydrogen. An example of such an adsorbent is active carbon.

Figure 3:
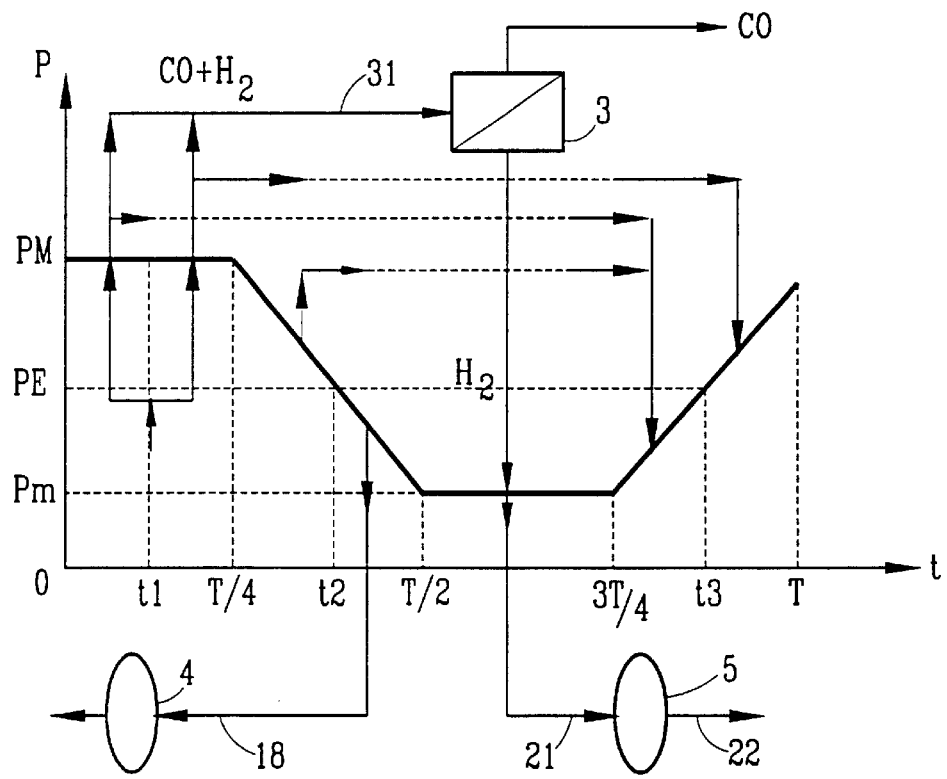
FIG. 3 is a diagram which shows the cycle of operation of the PSA unit of FIG. 2.

The installation comprises moreover means, known per se and not shown, for controlling, regulating and supplying electrically and with refrigerant fluid, adapted to perform the cycle shown in FIG. 3.

In FIG. 3, in which the time t is shown on the abscissa and the absolute pressure P on the ordinates, the lines indicated by arrows show the movements and destinations of the gas flows and, moreover, the direction of circulation in the adsorber:

The cycle is shown for an adsorber, for example the adsorber 23A. The other adsorbers undergo identical cycles but offset timewise by T/4, T/2 and 3T/4, wherein T is the cycle period.

The high pressure PM of the cycle is adjacent the reforming pressure, typically of the order of 30 bars absolute. The low pressure Pm of the cycle is at least equal to the atmospheric pressure and is typically of the order of 1.3 bar absolute.

The cycle of FIG. 3 comprises the following successive steps:

(a) From t=0 to T/4, a step of a substantially isobaric production at the high pressure PM of the cycle. The $CO/H_2$ production mixture is in part sent to the permeation unit 3 via the conduit 31.

In a first portion (a1) of step (a), from t=0 to t1, a fraction of the mixture is sent to another adsorber in the course of first countercurrent recompression. From t1 to T/4 (substep (a2)), a fraction of the mixture is sent to another adsorber in the course of final countercurrent recompression.

(b) From T/4 to t2<T/2, a first co-current decompression step, to an equilibrium pressure PE, by balancing pressures with another adsorber in the course of first countercurrent recompression.

(c) From t2 to T/2, a final countercurrent decompression step from pressure PE to the low pressure Pm of the cycle. The residual gas withdrawn in the course of this step, from the inlet of the adsorber, is rich in $CO_2$, $CH_4$ and CO and is recycled, via the conduit 18, the buffer 4, the compressor 6 and the conduit 19, to the inlet of the reforming unit 1. The recycling of a fraction rich in $CO_2$ permits shifting the equilibrium of the reaction $CO+H_2O=CO_2+H_2$ in the direction of the production of CO, and hence increasing the CO output of the installation.

(d) From T2 to 3T/4, an elution step in the vicinity of the low pressure Pm. In the course of this step, residual hydrogen from the permeation unit 3, constituting the permeate of this unit, is introduced countercurrent into the adsorber, and the residual gas from the inlet of the latter is sent to the burners 8 via the conduit 21, the buffer 5 and the conduit 22. The low pressure hydrogen is thus used a first time as elution gas for the adsorbent, and a second time as combustible gas to carry out reforming.

(e) From 3T/4 to t3, with t3−3T/4=t2−T/4, a first countercurrent recompression step by pressure balancing with another adsorber in the course of step (b) of first co-current decompression. In the course of this step, the adsorber receives simultaneously countercurrent $CO/H_2$ production gas from another adsorber in production substep (a1).

(f) From t3 to T, a final countercurrent recompression step to the high pressure PM, with $CO/H_2$ mixture from the same other adsorber in production substep (a2).

There can be obtained, with the installation described with respect to FIGS. 1 to 3, high purity CO, containing less than 1% hydrogen and less than 50 vpm (parts per million in gaseous phase) of $CH_4$.

Figure 4:
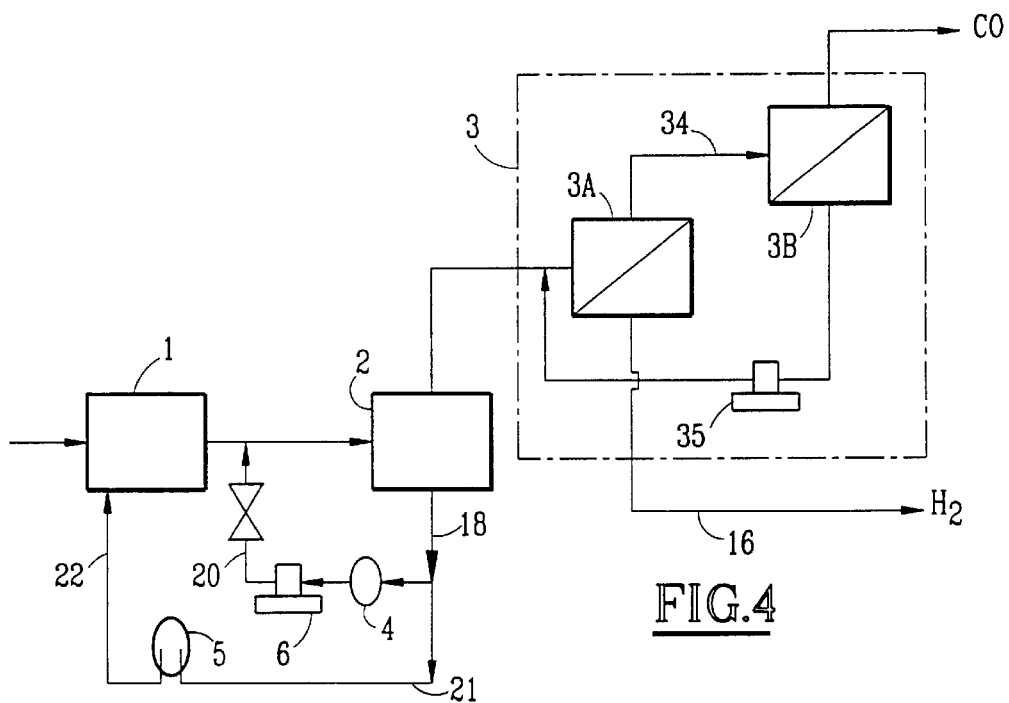
FIG. 4 is a diagram of a modified embodiment of the installation.

FIG. 4 shows a simplified modification of the installation of FIG. 1, in which the residual gas from the unit 2 is not divided into two fractions but is totally sent toward the burners 8 via conduit 21 as combustion gas, to the extent necessary for these burners. The rest of the residual gas is recompressed at 6 and recycled toward the inlet of the PSA unit via the conduit 20.

Moreover, in the example of FIG. 4, the permeation unit 3 is of two stages: the gas rich in CO from the first stage 3A is sent via a conduit 34 to the second stage 3B, in which the purification of the CO takes place to supply CO of very high purity. The permeate from the first stage is sent to a use via the conduit 16, whilst that of the second stage, richer in CO, is recompressed in a compressor 35 and recycled to the inlet of the first stage 3A to recover its CO.

Figure 5:
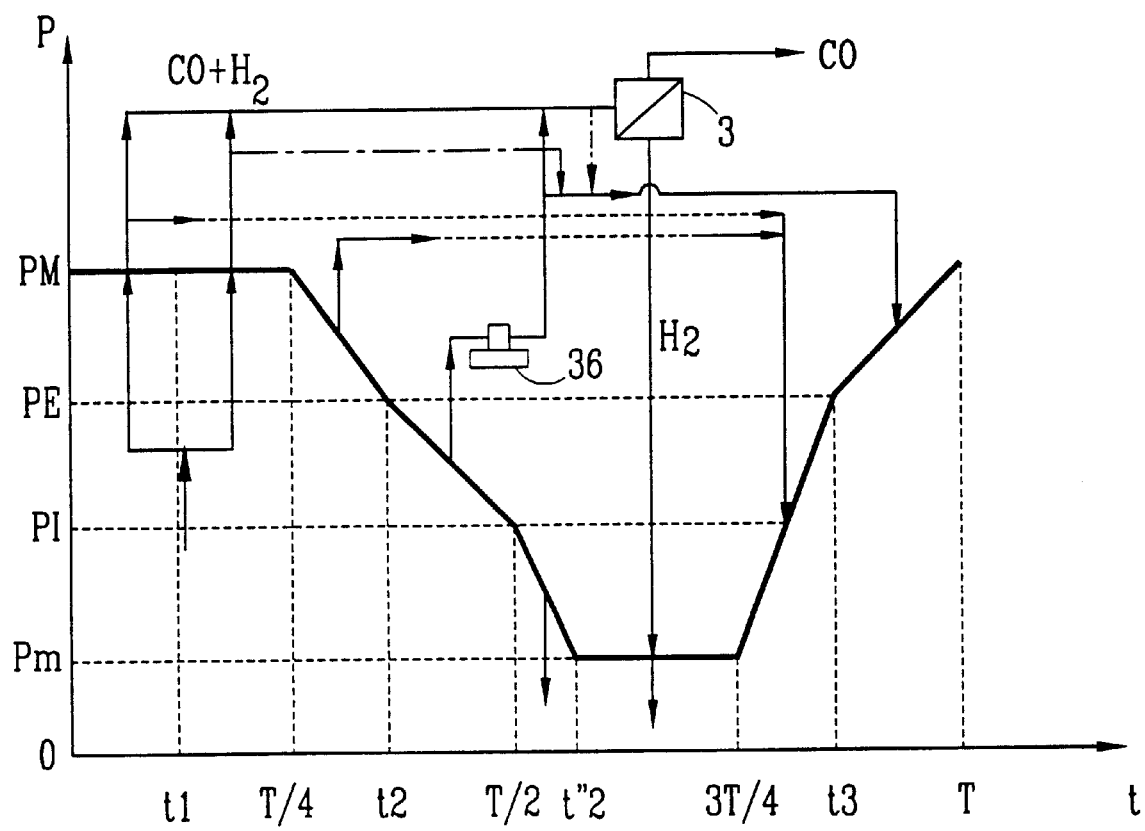
FIG. 5 is a diagram analogous to that of FIG. 3, showing another modification.

The PSA cycle shown in FIG. 5 differs from that of FIG. 3 as to the following points:

(1) From t2 to T/2, the adsorber undergoes a second co-current decompression (b2), from pressure PE to an intermediate pressure PI. The gas from the adsorber, again rich in CO, is recompressed to the high pressure PM by an auxiliary compressor 36 and then partially mixed with the production gas from another adsorber in production step (a) and, as to the rest, sent to the outlet of another adsorber in final recompression step (f).

As indicated by broken line in FIG. 5, as a modification or supplement, this final recompression can use production gas as in FIG. 3, and/or a mixture of this gas and gas recompressed by the compressor 36.

(2) Final countercurrent decompression step (c) is offset by T/2 to t"2<3T4, and elution step (d) is correspondingly shortened.

The mode of operation of FIG. 5 can increase the output of pure CO, the more the pressure PI is lower.

In this mode of practicing the invention, by adjusting the parameters of permeation, the permeator 3 can be used to produce in parallel, as needed, a $CO/H_2$ mixture having an adjusted content of CO and containing very little impurities, typically less than 1 vpm $H_2O$, and several tens to several hundreds of vpm of $CO_2$ and $CH_4$.

What is claimed is:

1. A process for the production of carbon monoxide (CO) from a supply gas containing essentially carbon monoxide, hydrogen and other constituents including carbon dioxide, methane and water, which comprises:

sending the supply gas to a pressure swing adsorption (PSA) unit which contains an adsorbent having a low affinity for hydrogen and carbon monoxide and a high affinity for said other constituents to obtain a production gas consisting essentially of a mixture of carbon monoxide and hydrogen; and sending the production gas from the pressure swing adsorption unit to a permeation unit for the purification of the carbon monoxide; the permeation unit having a permeate outlet and a non-permeate outlet and being provided with membranes having a high carbon monoxide/hydrogen selectivity to supply at the non-permeate outlet pure carbon monoxide, and at the permeate outlet low pressure residual hydrogen containing no more than 3% carbon monoxide.

2. The process according to claim 1, wherein the pressure of the residual hydrogen is less than about 1.3 bar absolute.

3. The process according to claim 1, wherein the membranes are polyaramid membranes.

4. The process according to claim 1, wherein at least a portion of the residual hydrogen of the permeation unit is used to regenerate the adsorbent.

5. The process according to claim 1, wherein in the course of a cycle of operation of the pressure swing adsorption unit, each adsorber undergoes a partial co-current decompression step in the course of which a gas from its outlet is recompressed to a high pressure of the cycle and sent, at least in part, to the permeation unit.

6. The process according to claim 1, wherein at least a fraction of residual gas from the pressure swing adsorption unit, containing a substantial quantity of carbon monoxide, is compressed, and then recycled to the pressure swing adsorption unit.

7. The process according to claim 1, wherein the supply gas is a steam reforming gas from a hydrocarbon charge, and at least a fraction of residual gas from the pressure swing adsorption unit, relatively rich in carbon dioxide, is compressed, and then recycled to an input of a reforming unit.

8. The process according to claim 1, wherein the supply gas is a steam reforming gas from a hydrocarbon charge, and at least a fraction of residual gas from the pressure swing adsorption unit, relatively rich in hydrogen, is recycled to burners of a reforming unit.

9. A process for the production of carbon monoxide (CO) from a supply gas containing essentially carbon monoxide, hydrogen ($H_2$) and other constituents including carbon dioxide, methane and water, which comprises:

sending the supply gas to a pressure swing adsorption (PSA) unit which contains an adsorbent having a low affinity for hydrogen and carbon monoxide, and a high affinity for said other constituents to obtain a production gas consisting essentially of a mixture of carbon monoxide and hydrogen;

sending the production gas from the pressure swing adsorption unit to a permeation unit for the purification of the carbon monoxide; the permeation unit having a permeate outlet and a non-permeate outlet, and being provided with membranes having a high $CO/H_2$ selectivity to supply at the non-permeate outlet pure carbon monoxide, and at the permeate outlet low pressure residual hydrogen; and using at least a portion of the residual hydrogen of the permeation unit to regenerate the adsorbent of the pressure swing adsorption unit.

* * * * *